United States Patent
Abouelleil et al.

(10) Patent No.: US 10,794,494 B2
(45) Date of Patent: Oct. 6, 2020

(54) BONDED SEAT WITH ANNULAR RIBS

(71) Applicant: Mueller International, LLC, Atlanta, GA (US)

(72) Inventors: Ashraf Abouelleil, Oswego, IL (US); Xianhua Feng, Hubei (CN)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 15/949,194

(22) Filed: Apr. 10, 2018

(65) Prior Publication Data

US 2019/0309857 A1   Oct. 10, 2019

(51) Int. Cl.
| | |
|---|---|
| *F16K 1/226* | (2006.01) |
| *F16K 1/228* | (2006.01) |
| *F16K 1/22*  | (2006.01) |
| *B23P 15/00* | (2006.01) |

(52) U.S. Cl.
CPC .......... *F16K 1/2263* (2013.01); *B23P 15/001* (2013.01); *F16K 1/224* (2013.01); *F16K 1/228* (2013.01); *F16K 1/2268* (2013.01)

(58) Field of Classification Search
CPC ...... F16K 1/2057; F16K 1/2064; F16K 1/207; F16K 1/2263; F16K 1/2265; F16K 1/2268; F16K 1/425; F16K 1/427; F16K 1/46; F16K 1/465; F16K 5/0271; F16K 5/0471; F16K 5/0667; F16K 5/0689; F16K 27/0218; F16K 27/0272; F16K 41/063; F16K 41/066
See application file for complete search history.

(56) References Cited

U.S. PATENT DOCUMENTS

| | | | | | |
|---|---|---|---|---|---|
| 3,311,128 | A | * | 3/1967 | Taylor ................... | F16K 1/2265 137/383 |
| 3,675,888 | A | * | 7/1972 | Scaramucci ........... | F16K 1/2265 249/57 |
| 4,055,323 | A | * | 10/1977 | Gachot ................. | F16K 1/2263 251/306 |
| 4,998,708 | A | * | 3/1991 | Pavanel ................ | F16K 1/2265 251/306 |
| 5,695,170 | A | * | 12/1997 | Dernovsek ............ | F16K 1/2268 251/305 |
| 2002/0074040 | A1 | * | 6/2002 | Schwarz ............. | B29C 45/1459 137/375 |
| 2011/0079743 | A1 | * | 4/2011 | Tsai ...................... | F16K 1/2265 251/314 |
| 2019/0101214 | A1 | * | 4/2019 | Abouelleil ............ | F16K 1/2263 |

FOREIGN PATENT DOCUMENTS

| | | | | | |
|---|---|---|---|---|---|
| DE | 3602425 | A1 | * | 7/1987 | .......... F16K 1/2263 |
| FR | 1522379 | A  | * | 4/1968 | .......... F16K 1/2265 |
| FR | 2398239 | A1 | * | 2/1979 | .......... F16K 1/2268 |

* cited by examiner

*Primary Examiner* — Hailey K. Do
(74) *Attorney, Agent, or Firm* — Taylor English Duma LLP (57) ABSTRACT

A bonded seat for a butterfly valve can comprise a first axial end and a second axial end distal from the first axial end; a central section between the first axial end and the second axial end, the central section defining a radially inward surface and a radially outward surface, the radially inward surface defining a fluid bore therethrough from the first axial end to the second axial end, the radially outward surface defining a plurality of annular ribs.

21 Claims, 7 Drawing Sheets

BONDED SEAT WITH ANNULAR RIBS

TECHNICAL FIELD

This disclosure relates to fluid valves. More specifically, this disclosure relates to butterfly valves with bonded rubber seats.

BACKGROUND

A fluid valve can comprise a valve body and a seat positioned within the valve body. In some valves, a valve disc is positioned within the seat in a fluid bore defined through the seat and defines a seal with the seat. The valve disc can be moved about and between a closed position blocking a fluid path through the fluid bore and an open position opening the fluid path through the fluid bore. In the closed position, the valve disc forms a seal with the seat. Butterfly valves are valves with a rotatable valve disc positioned in the fluid bore and with a stem attached to the valve that can be turned to rotate the valve disc. Bonded seat valves are valves in which the seat is molded over an inner surface of the valve body. In bonded seat butterfly valves, portions of the seat around the stem can be unintentionally shifted relative to the valve body when the disc is rotated, reducing the tightness of the seal between the seat and the valve disc. Shifting of portions of the seat can also occur when the valve is pressurized with fluid pressure pressing on one side of the valve disc, pushing the valve disc slightly downstream and thereby pushing against the seat at edges of the valve disc. The portions of the seat around the stem are typically smooth, making shifting of the seat easier and therefore more prone to seal failure.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a bonded seat for a butterfly valve comprising a first axial end and a second axial end distal from the first axial end; a central section between the first axial end and the second axial end, the central section defining a radially inward surface and a radially outward surface, the radially inward surface defining a fluid bore therethrough from the first axial end to the second axial end, the radially outward surface defining a plurality of annular ribs.

Also disclosed is a bonded seat valve comprising a valve body comprising a first axial end, a second axial end, and a central section, the first axial end distal from the second axial end, the central section between the first axial end and the second axial end, the central section defining a radially inward surface and a radially outward surface, the radially inward surface defining a seat bore therethrough from the first axial end to the second axial end, the radially inward surface defining a plurality of annular grooves; a seat positioned in the seat bore and bonded to the radially inward surface of the central section of the valve body, the seat including a first axial end, a second axial end, and a central section, the first axial end distal from the second axial end, the central section between the first axial end and the second axial end, the central section defining a radially inward surface and a radially outward surface, the radially inward surface defining a fluid bore therethrough from the first axial end to the second axial end, the radially outward surface defining a plurality of annular ribs extending into the plurality of annular grooves; and a valve disc positioned in the fluid bore of the seat and configured to move about and between a closed position and an open position, wherein the valve disc in the closed position blocks a flow path from the first axial end of the seat to the second axial end of the seat, and wherein the valve disc in the open position opens the flow path from the first axial end of the seat to the second axial end of the seat.

Also disclosed is a method of manufacturing a bonded seat valve, the method comprising forming a valve body including a first axial end, a second axial end, and a central section, the first axial end distal from the second axial end, the central section between the first axial end and the second axial end, the central section defining a radially inward surface and a radially outward surface, the radially inward surface defining a seat bore therethrough from the first axial end to the second axial end, the radially inward surface defining a plurality of annular grooves; molding a seat over the radially inward surface in the seat bore of the valve body, the seat including a first axial end, a second axial end, and a central section, the first axial end distal from the second axial end, the central section between the first axial end and the second axial end, the central section defining a radially inward surface and a radially outward surface, the radially inward surface defining a fluid bore therethrough from the first axial end to the second axial end, the radially outward surface defining a plurality of annular ribs extending into the plurality of annular grooves; and positioning a valve disc in the fluid bore of the seat.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements of the valve disclosed herein, the conventions of "top," "bottom," "inner," "outer," "inside," or "outside," may be referenced. Unless stated otherwise here or in the figures, "top" describes that side or end of the valve that is facing upward as shown in the figures and "bottom" is that side or end of the valve that is opposite or distal the top of the valve and is facing downward as shown in the figures. Likewise, "outer" describes that side of the valve that is facing outward and "inner" is that side of the valve that is facing inward.

Disclosed is a bonded seat and associated methods, systems, devices, and various apparatus. The bonded seat can comprise a first axial end, a second axial end, and a central section. It would be understood by one of skill in the art that the disclosed bonded seat is described in but a few exemplary aspects among many. No particular terminology or description should be considered limiting on the disclosure or the scope of any claims issuing therefrom.

Figure 1:
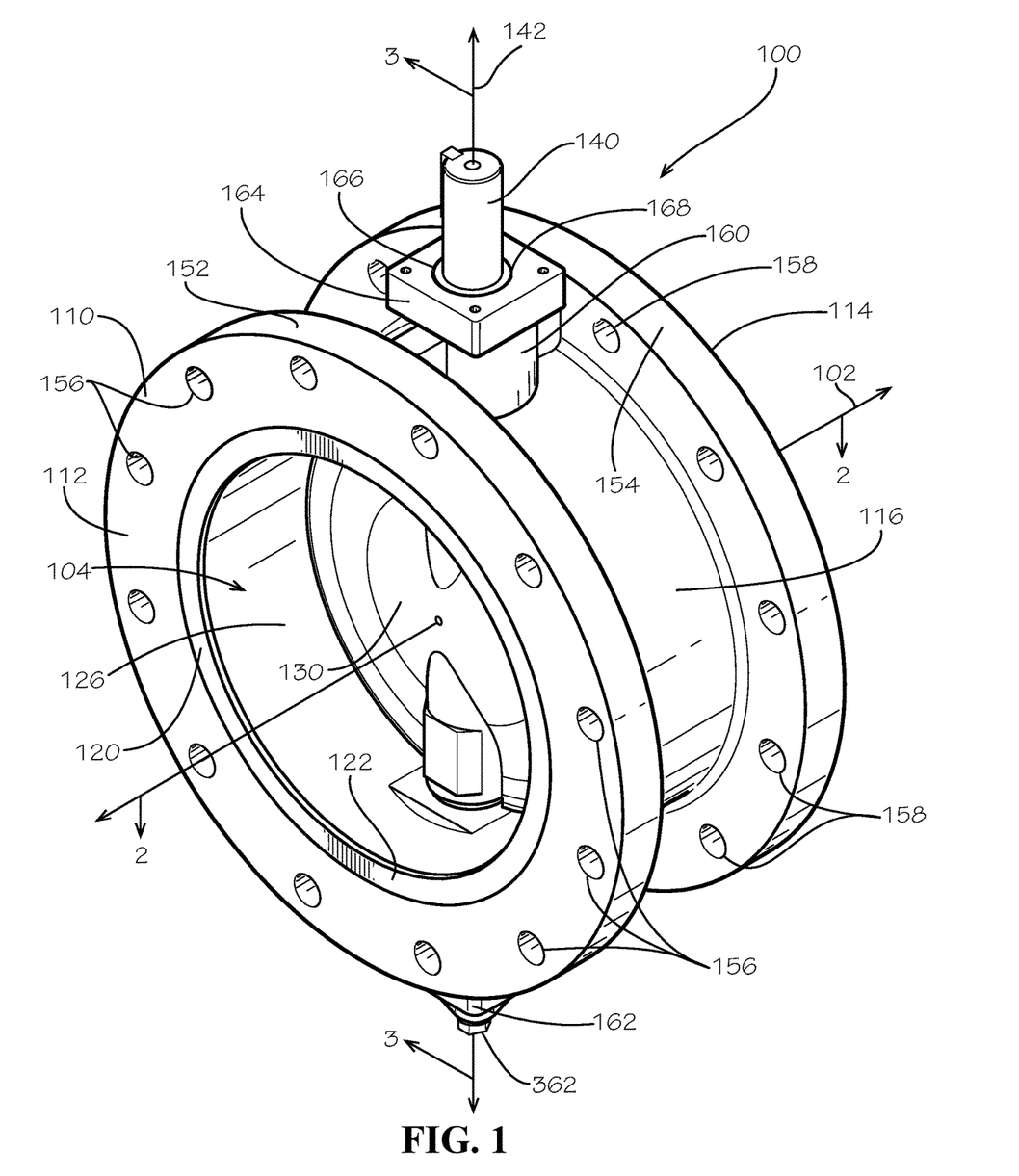
FIG. 1 is a perspective view of a bonded seat valve comprising a valve body, a seat, a valve disc, and a stem in accordance with one aspect of the present disclosure.

One aspect of a bonded seat valve 100 is shown in FIG. 1. The bonded seat valve 100 can comprise a valve body 110, a seat 120, a valve disc 130, and a stem 140. The bonded seat valve 100 can define an axis 102 extending through the bonded seat valve 100, and can comprise an inlet 104 and an outlet 204 (shown in FIG. 2). The valve body 110 can comprise a first axial end 112 and a second axial end 114 relative to the axis 102, and the seat 120 can define a first axial end 122 and a second axial end 124 (shown in FIG. 2) relative to the axis 102. The valve body 110 can also comprise a central section 116 between first axial end 112 and the second axial end 114. Likewise, the seat 120 can also comprise a central section 126 between first axial end 122 and the second axial end 124.

The valve body 110 can comprise a first mounting flange 152 at the first axial end 112 and a second mounting flange 154 at the second axial end 114. The first mounting flange 152 and the second mounting flange 154 can each define a plurality of mounting bores 156,158, respectively, and can each be configured for attachment to complementary mounting flanges on pipe elements such as flanged pipes or pipe fittings or for attachment to restraint devices such as mechanical joint restraints that are, for example, configured to attach the bonded seat valve assembly 100 to pipe elements such as plain-end pipes. The mounting bores 156,158 can thus be configured for use with fasteners such as nuts and bolts to attach the mounting flanges 152,154 to other mounting flanges or restraint devices. The valve assembly 100 can thereby be mounted in pipe systems such as municipal water systems.

The valve body 110 can also comprise a top trunnion 160 and a bottom trunnion 162. The top trunnion 160 can comprise a mounting flange 164 and can define an upper stem bore 166 therethrough. The stem 140 can extend through the upper stem bore 166 to the valve disc 130 and a stem packing 168 can surround the stem 140 in the upper stem bore 166 proximate to the mounting flange 164. The stem 140 can define a stem axis 142 therethrough that can intersect the axis 102 at a perpendicular angle. An actuator (not shown) can be attached to the stem 140 and the mounting flange 164 to rotate the stem 140 and the valve disc 130 about the stem axis 142. In various aspects, the actuator can be any desired configuration, such as a mechanical, electrical, or hydraulic actuator, including but not limited to a nut, a handle, a handwheel, a chainwheel, an electric motor, or a hydraulic or pneumatic cylinder.

Figure 2:
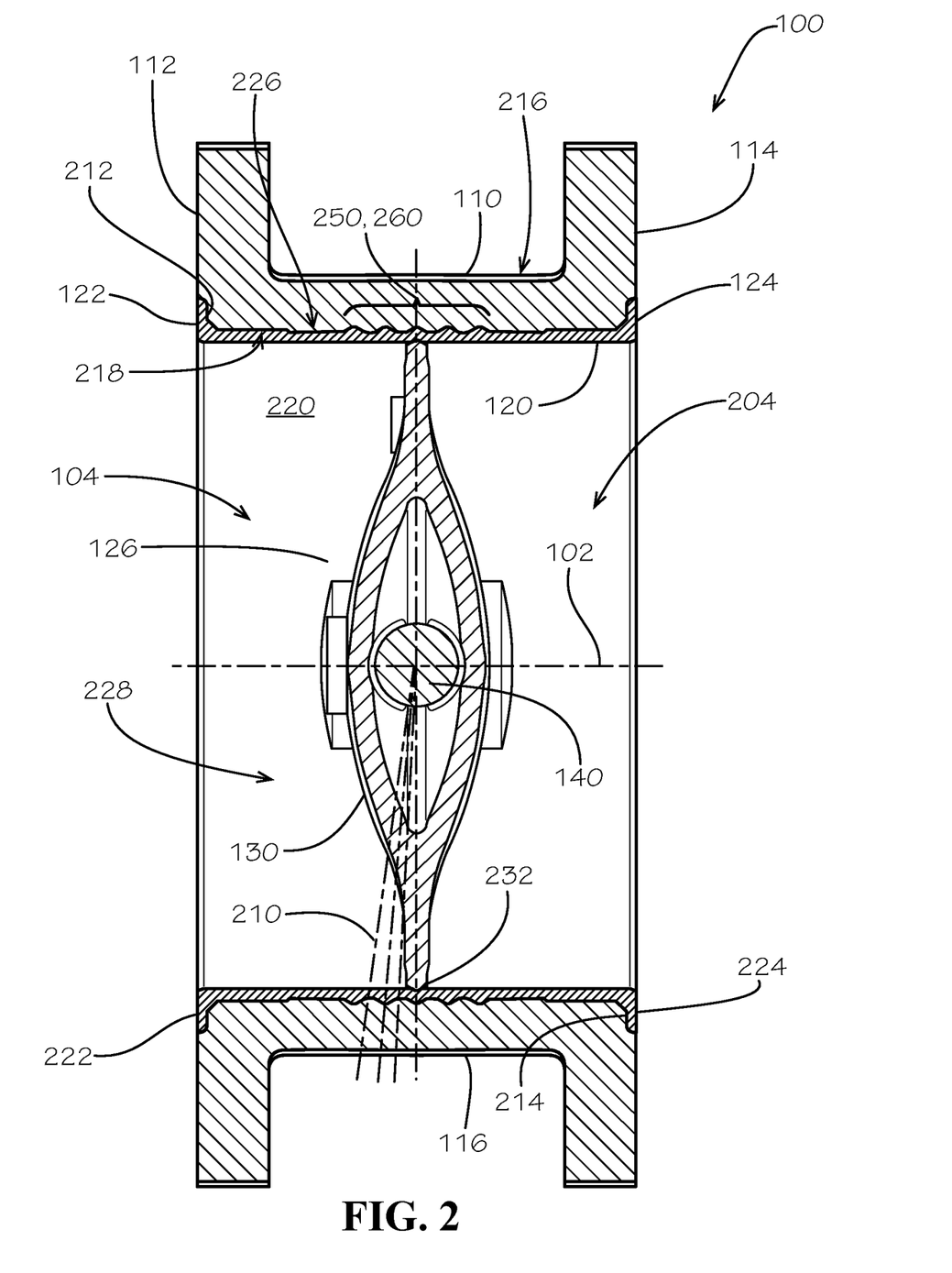
FIG. 2 is a cross-sectional view of the bonded seat valve of FIG. 1 taken from line 2-2 in FIG. 1.

As shown in FIG. 2, the valve disc 130 can be positioned within the seat 120 and the stem 140 can extend through the valve disc 130. Angles 210 show how the valve disc 130 can be rotated about the stem axis 142 into and out of sealing engagement with the seat 120. The valve disc 130 is shown in a closed position with the valve disc 130 in sealing engagement with the seat 120, and rotating the valve disc 130 on the stem axis 142 towards and past angles 210 moves the valve disc 130 to an open position that opens a flow path from the first axial end 122 to the second axial end 124, allowing fluid to flow from the inlet 104 to the outlet 204.

The central section 126 of the seat 120 can define a radially inward surface 220 and a radially outward surface 226. The radially inward surface 220 can define fluid bore 228 therethrough from the first axial end 122 to the second axial end 124. An outer edge 232 of the valve disc 130 can seal against the radially inward surface 220 of the seat 120 in the closed position, blocking the fluid path through the fluid bore 228 from the first axial end 122 to the second axial end 124 and compressing a portion of the seat 120 that the outer edge 232 engages against. The seat 120 can also define a first flange 222 defined at the first axial end 122 and a second flange 224 defined at the second axial end 124. The flanges 222,224 can extend radially outward relative to the axis 102. The first flange 222 can be positioned in a first flange cutout 212 defined in the first axial end 112 of the valve body 110 and the second flange 224 can be positioned in a second flange cutout 214 defined in the second axial end 114 of the valve body 110. The first axial end 112 of the valve body 110 can therefore be coplanar with the first axial end 122 of the seat 120, and the second axial end 114 of the valve body 110 can likewise be coplanar with the second axial end 124 of the seat 120.

The central section 116 of the valve body 110 can define a radially inward surface 218 and a radially outward surface 216. The radially inward surface 218 can define a seat bore 710 (shown in FIG. 7) therethrough extending from the first axial end 112 to the second axial end 114. The radially outward surface 226 of the central section 126 of the seat 120 can be bonded to the radially inward surface 218 of the central section 116 of the valve body 110. In various aspects, the seat 120 can be bonded to the valve body 110 by molding the seat 120 over the radially inward surface 218 of the valve body 110. In particular, the seat 120 can be molded by molding rubber, such as EPDM rubber or Buna-N rubber, in a mold covering the radially inward surface 218 of the valve body 110, which itself can be formed from cast iron in some aspects. The valve body 110 can be cast from cast iron by casting the valve body 110 in a mold, such as a sand mold. When the valve body 110 is formed from cast iron and the seat 120 is formed from molded rubber, the rubber flows into and solidifies within imperfections defined in the radially inward surface 218 formed in the casting process of forming the valve body 110, and the seat 120 is thereby bonded to the valve body 110.

The radially outward surface 226 of the seat 120 can comprise a plurality of annular ribs 250 extending radially outward from the central section 126, and the radially inward surface 218 of the valve body 110 can comprise a plurality of annular grooves 260. The plurality of annular ribs 250 can extend into the plurality of annular grooves 260. When the valve disc 130 rotates towards the closed position, closing the angle 210, the outer edge 232 of the valve disc 130 compresses the seat 120 into the plurality of grooves 260, thereby preventing any portions of the seat 120 from shifting relative to the valve body 110. The ribs 250 and grooves 260 thereby act to ensure tightness of the seal between the valve disc 130 and the seat 120 when the valve disc 130 is in the closed position.

Figure 3:
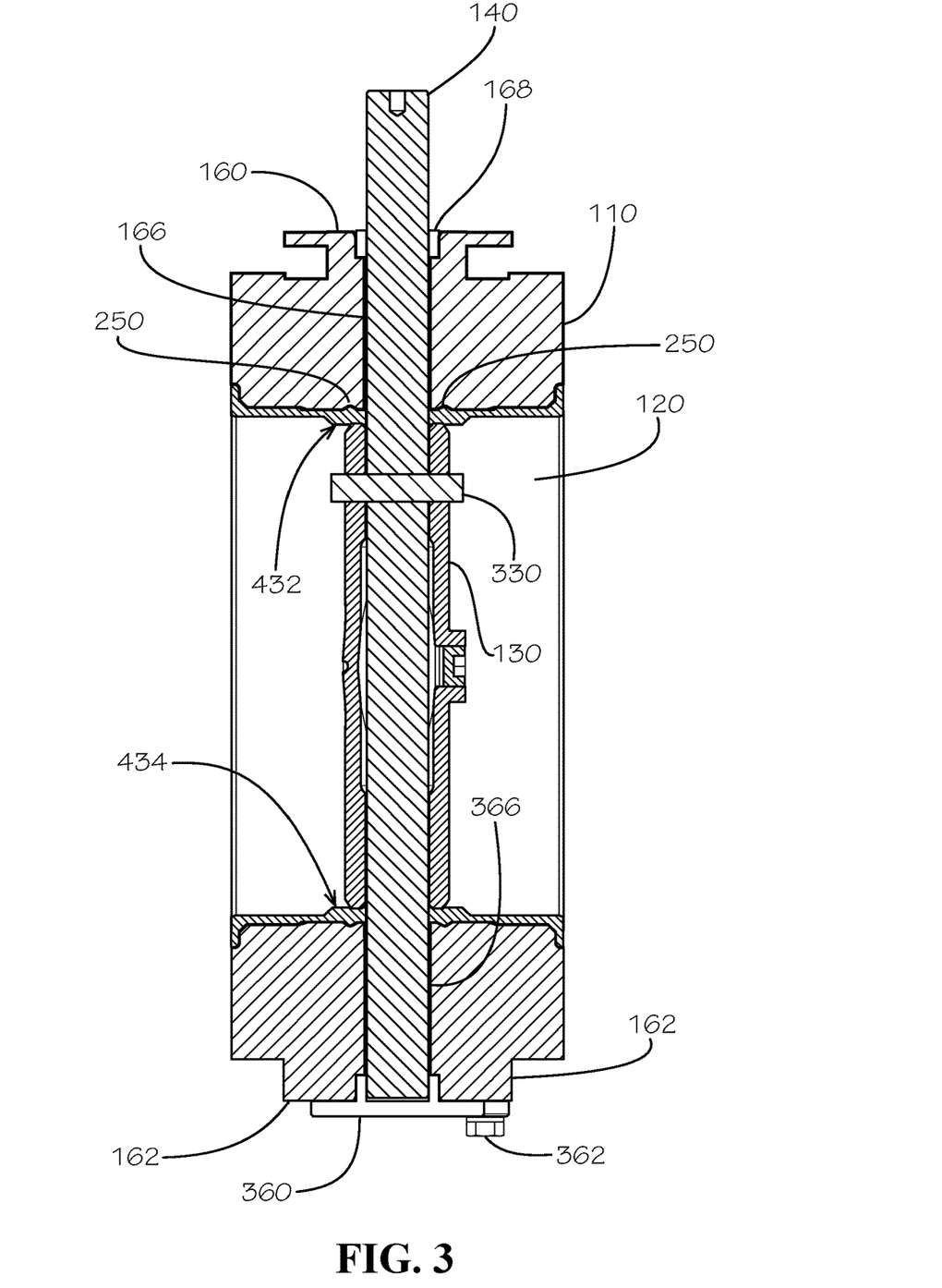
FIG. 3 is a cross-sectional view of the bonded seat valve of FIG. 1 taken from line 3-3 in FIG. 1.

As shown in FIG. 3, the stem 140 can extend entirely through the valve disc 130 from the top trunnion 160 to the bottom trunnion 162. The valve assembly 100 can further comprise a bottom cap 360 attached to the bottom trunnion 162 by fasteners 362 and covering a lower stem bore 366 through the bottom trunnion 162. A pin 330 can attach the stem 140 to the valve disc 130. In other aspects, the stem 140 can only extend through the upper stem bore 166 and a second stem (not shown) can extend through the lower stem bore 366, both stems attaching to the valve disc 130 at opposite ends of the valve disc 130. In other aspects, the stem 140 only extends through the upper stem bore 166 to attach to an upper end of the valve disc 130 and no other stem extends through the valve body 110.

Figure 4:
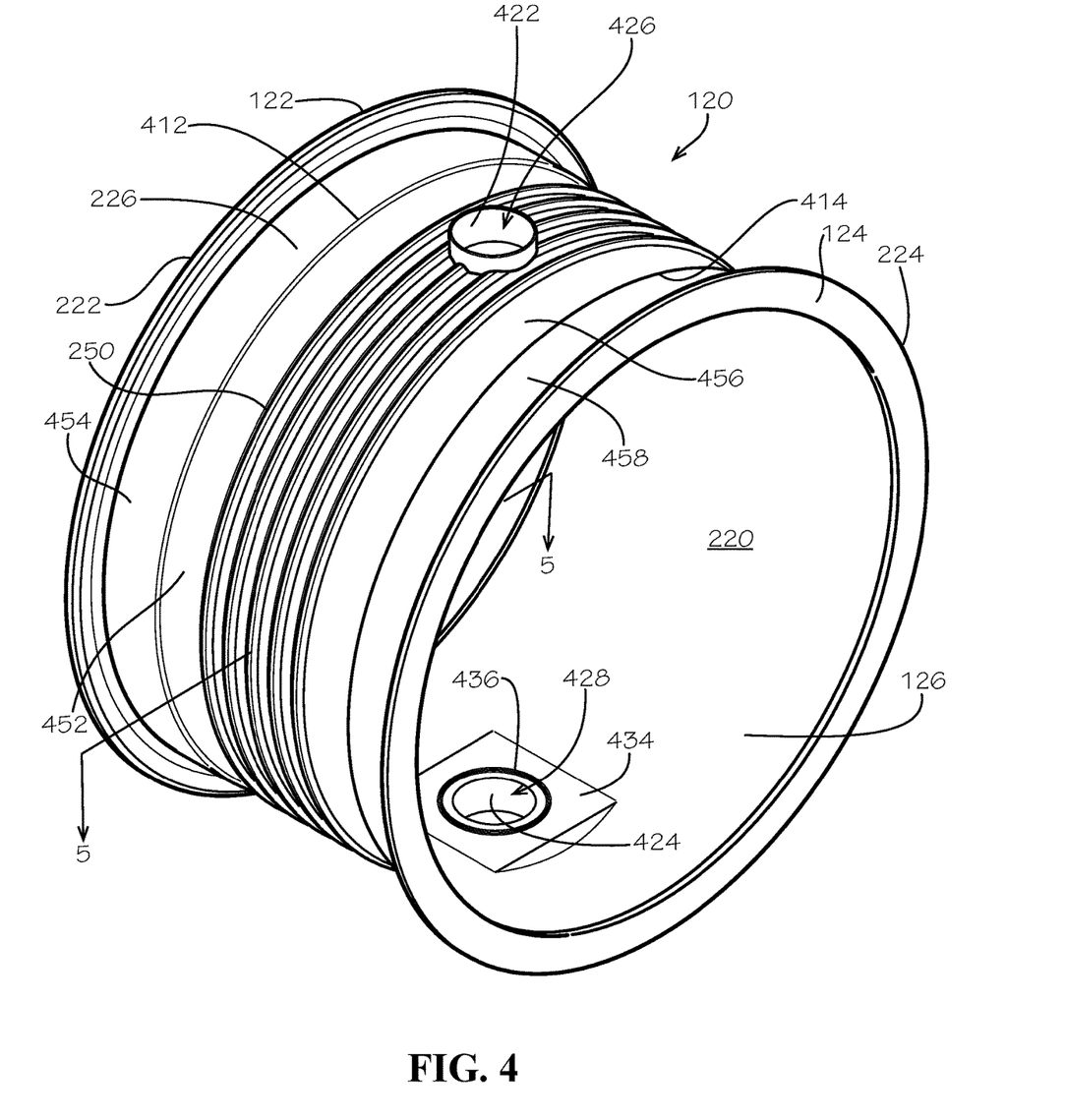
FIG. 4 is a perspective view of the seat of the valve disc of FIG. 1.

As shown in FIG. 4, the seat 120 can define an upper stem bore 426 and a lower stem bore 428. The seat 120 can comprise an upper stem flange 422 defining the upper stem bore 426 therethrough and a lower stem flange 424 defining the lower stem bore 428 therethrough. The upper stem flange 422 and the lower stem flange 424 can each act to seal against the stem 140 to prevent leakage between the stem 140 and the valve body 110. The inner surface 220 can also define an upper bearing surface 432 (shown in FIG. 3) and a lower bearing surface 434. In the current aspect, the upper bearing surface 432 and the lower bearing surface 434 can each be generally flat such that the valve disc 130 can rotate on each bearing surface 432,434 when moving between the open position and the closed position. The bearing surfaces 432,434 can also define a plurality of annular ribs 436 surrounding the stem bores 426,428. The bearing surfaces 432,434 and the plurality of annular ribs 436 can thereby further seal against the valve disc 130 to prevent leakage through the stem bores 426,428.

In the current aspect, there are five annular ribs 250 defined on the radially outward surface 226. Three annular ribs 250 can intersect both the upper stem bore 426 and the lower stem bore 428, terminating at the upper stem flange 422 and the lower stem flange 424 but otherwise remaining continuous between the upper stem bore 426 and the lower stem bore 428. Two annular ribs 250 can extend completely and continuously around the seat 120 on the radially outward surface 226, with one annular rib 250 defined between the stem bores 426,428 and the first axial end 122 relative to the axis 102 (shown in FIG. 1) and another annular rib 250 defined between the stem bores 426,428 and the second axial end 124 relative to the axis 102. However, in other aspects, any other number of annular ribs 250 can intersect the stem bores 426,428 and be defined between the stem bores 426,428 and either of the axial ends 122,124.

The radially outward surface 226 can also define a pair of shoulders 412,414 between the annular ribs 250 and the first and second axial ends 122,124, respectively. The first shoulder 412 can be defined between the annular ribs 250 and the first axial end 122, and the second shoulder 414 can be defined between the annular ribs 250 and the second axial end 124. The radially outward surface 226 can also thereby define a radially inner cylindrical section 452 and a radially outer cylindrical section 454 on either side of the first shoulder 412, and a radially inner cylindrical section 456 and a radially outer cylindrical section 458 on either side of the second shoulder 414. The radially inner cylindrical section 452 can extend from the first shoulder 412 to the annular ribs 250 and the radially outer cylindrical section 454 can extend from the first shoulder 412 to the first flange 222. Likewise, the radially inner cylindrical section 456 can extend from the second shoulder 414 to the annular ribs 250 and the radially outer cylindrical section 458 can extend from the second shoulder 414 to the second flange 224. The shoulders 412,414 can similarly act to prevent portions of the seat 120 from shifting relative to the valve body 110 when the valve disc 130 rotates or when fluid pressure is applied to one side of the valve disc 130.

Figure 5:
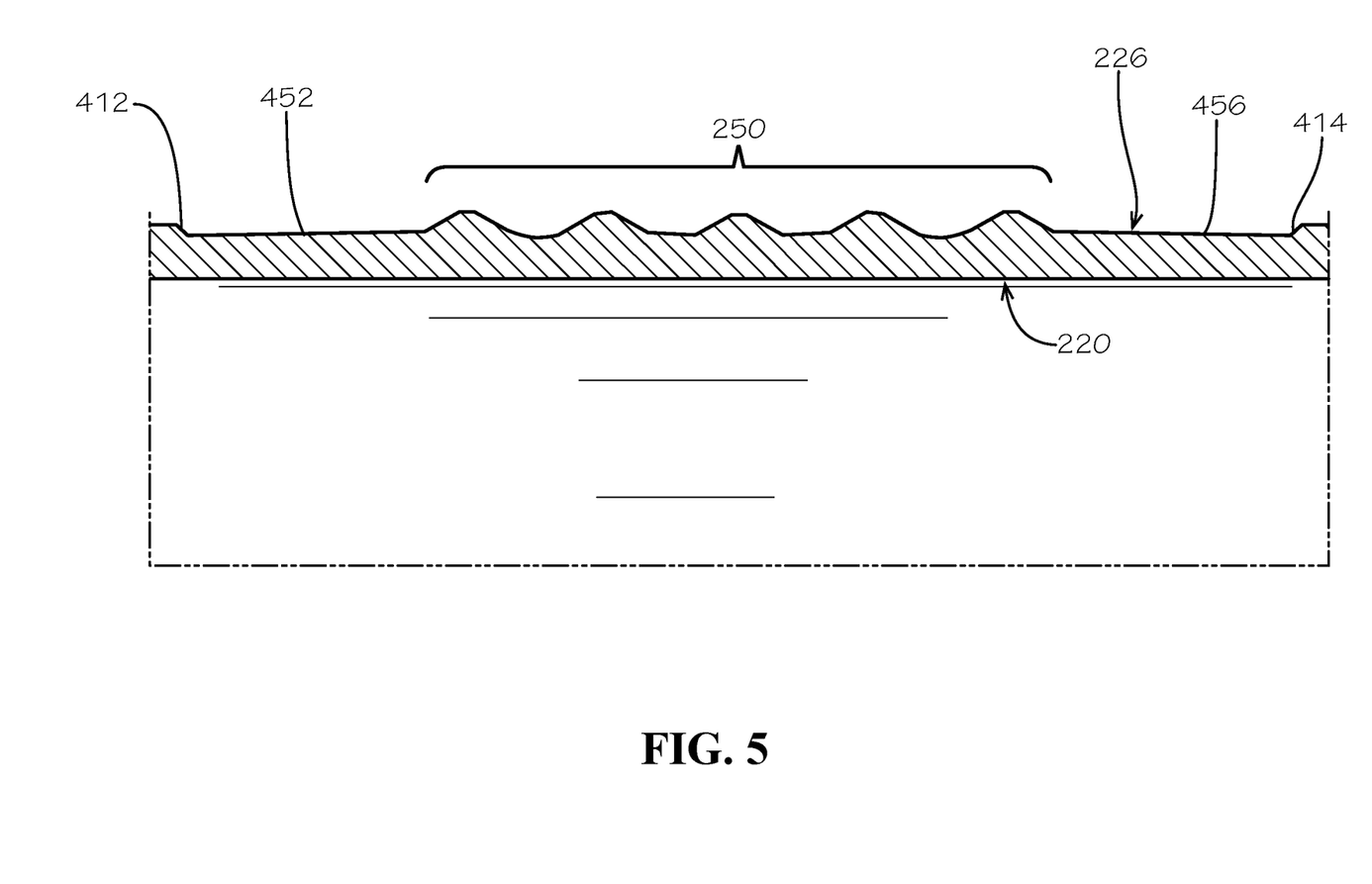
FIG. 5 is a cross-sectional view of a plurality of annular ribs defined on a radially outward surface of the seat of FIG. 4 taken from line 5-5 in FIG. 4.
Figure 6:
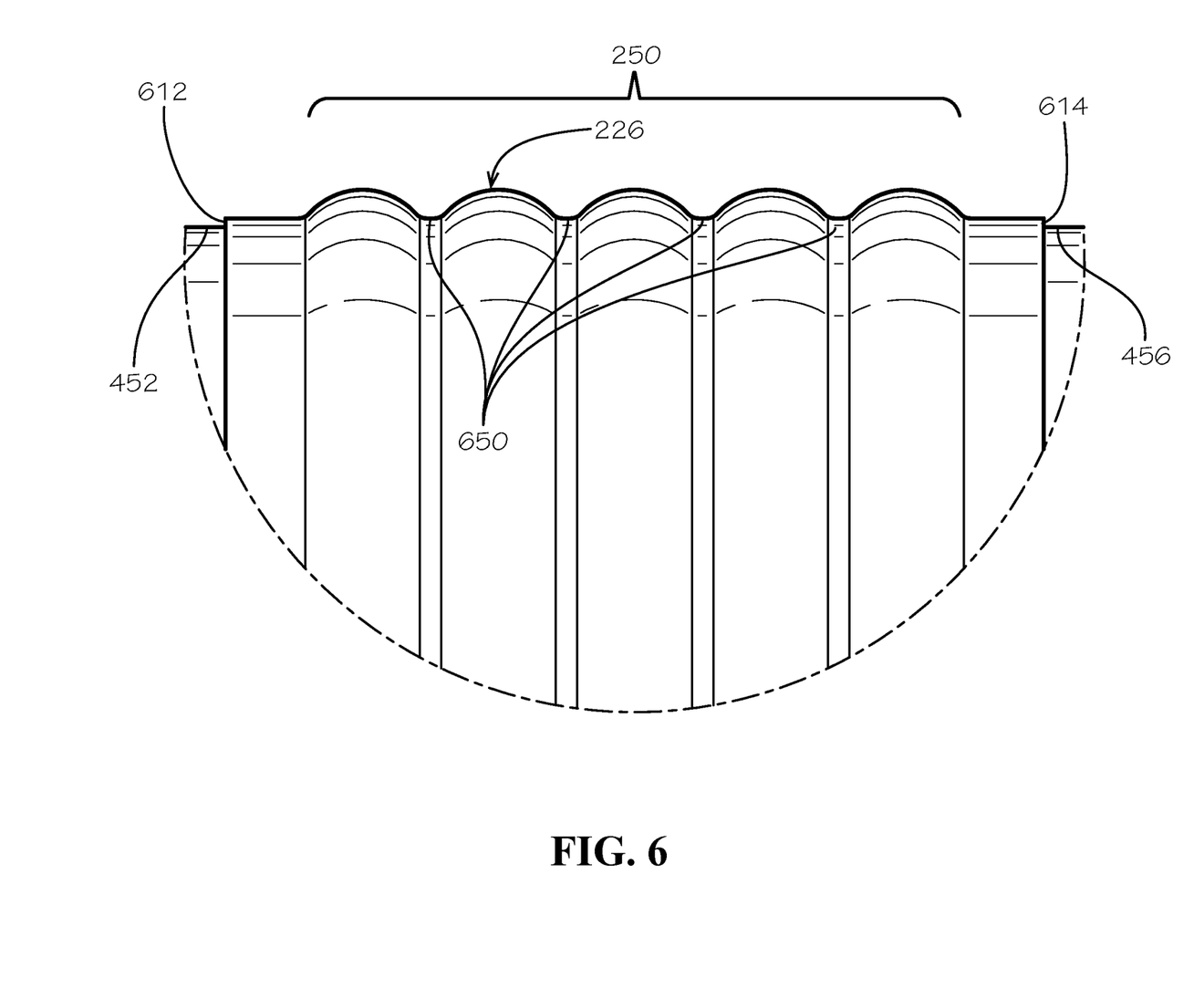
FIG. 6 is a detail view of a plurality of annular ribs defined on a radially outward surface of the seat of FIG. 4 in accordance with another aspect of the current disclosure.

FIG. 5 shows a cross-section of the plurality of annular ribs 250. As shown, in some aspects, the annular ribs 250 can define V-shaped cross-sections in which each side of each annular rib 250 defines a frustoconical shape. Additionally, as shown, the annular ribs 250 can extend a further distance in a radial direction relative to the axis 102 (shown in FIG. 1) from the inner cylindrical sections 452,456 than the shoulders 412,414. FIG. 6 shows another aspect of the plurality of annular ribs 250 in which the annular ribs 250 can define arcuate cross-sections. Additionally, the plurality of annular ribs 250 can each define a cylindrical transition section 650 therebetween to space the annular ribs 250 apart from each other. The radially outward surface 226 can also define an additional pair of shoulders 612,614 proximate to each side of the plurality of annular ribs 250 to serve as transitions from the annular ribs 250 to the radially inner cylindrical sections 452,456.

Figure 7:
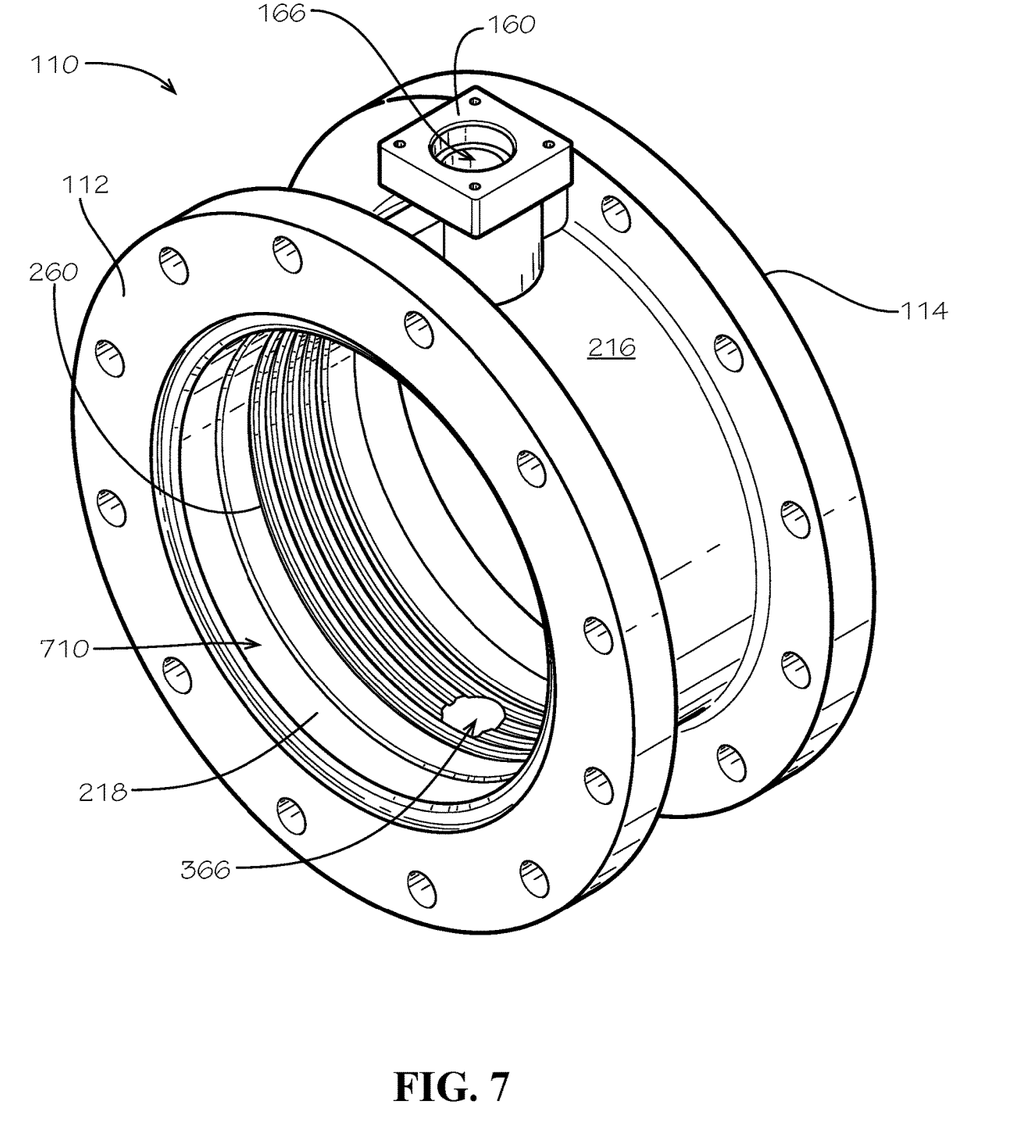
FIG. 7 is a perspective view of the valve body of FIG. 1

FIG. 7 shows the valve body 110 prior to molding the seat 120 to the valve body 110. As shown, five of the annular grooves 260 can be defined in the radially inward surface 218. Three annular grooves 260 can intersect both the upper stem bore 166 and the lower stem bore 366 but otherwise remain continuous between the upper stem bore 166 and the lower stem bore 366. Two annular grooves 260 can extend completely and continuously around the valve body 110 on the radially inward surface 218, with one annular groove 260 defined between the stem bores 166,366 and the first axial end 112 relative to the axis 102 (shown in FIG. 1) and another annular groove 260 defined between the stem bores 166,366 and the second axial end 114 relative to the axis 102. However, in other aspects, any other number of annular grooves 260 can intersect the stem bores 166,366 and be defined between the stem bores 166,366 and either of the axial ends 112,114.

The annular ribs 250 and annular grooves 260 thus control deformation and displacement of portions of the seat 120 proximate to the valve disc 130. The seal between the valve disc 130 and the seat 120 in the closed position is thus increased, reducing leak possibilities and increasing the pressure rating of the bonded seat valve 100.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

The invention claimed is:

1. A bonded seat for a butterfly valve comprising:
   a first axial end and a second axial end distal from the first axial end; and
   a central section between the first axial end and the second axial end, the central section defining a radially inward surface and a radially outward surface, the radially inward surface defining a fluid bore therethrough from the first axial end to the second axial end, the radially outward surface defining a first plurality of annular ribs, the radially inward surface defining a bearing surface, the bearing surface being generally flat and defining a perimeter, a stem bore defined extending through the central section from the radially inward surface to the radially outward surface, the bearing surface defining a second plurality of annular ribs surrounding the stem bore, each annular rib of the second plurality of annular ribs being spaced inwards from the perimeter towards the stem bore.

2. The bonded seat of claim 1, wherein the radially outward surface defines a first cylindrical portion and a second cylindrical portion, the first cylindrical portion between the first plurality of annular ribs and the first axial end, and the second cylindrical portion between the first plurality of annular ribs and the second axial end.

3. The bonded seat of claim 1, further comprising a first flange defined at the first axial end and a second flange defined at the second axial end.

4. The bonded seat of claim 1, wherein the radially inward surface is cylindrical.

5. The bonded seat of claim 1, wherein the first plurality of annular ribs comprises at least five annular ribs.

6. The bonded seat of claim 1, wherein at least one of the first plurality of annular ribs extends completely around the central section.

7. The bonded seat of claim 1, wherein the first plurality of annular ribs define V-shaped cross-sections.

8. The bonded seat of claim 1, wherein the first plurality of annular ribs define arcuate cross-sections.

9. The bonded seat of claim 1, wherein the bonded seat comprises a rubber, and wherein the bearing surface and the second plurality of annular ribs are formed from the rubber.

10. The bonded seat of claim 1, wherein the second plurality of annular ribs comprises at least three annular ribs.

11. The bonded seat of claim 1, wherein at least one of the first plurality of annular ribs intersects the stem bore.

12. The bonded seat of claim 11, wherein at least one of the first plurality of annular ribs is defined between the stem bore and the first axial end, and at least one other of the first plurality of annular ribs is defined between the stem bore and the second axial end.

13. A bonded seat valve comprising:
a valve body comprising a first axial end, a second axial end, and a central section, the first axial end distal from the second axial end, the central section between the first axial end and the second axial end, the central section defining a radially inward surface and a radially outward surface, the radially inward surface defining a seat bore therethrough from the first axial end to the second axial end, the radially inward surface defining a plurality of annular grooves;
a seat positioned in the seat bore and bonded to the radially inward surface of the central section of the valve body, the seat comprising a rubber, the seat comprising a first axial end, a second axial end, and a central section, the first axial end distal from the second axial end, the central section between the first axial end and the second axial end, the central section defining a radially inward surface and a radially outward surface, the radially inward surface defining a fluid bore therethrough from the first axial end to the second axial end, the radially outward surface defining a first plurality of annular ribs extending into the plurality of annular grooves, the radially inward surface defining a bearing surface, a stem bore defined extending through the central section of the seat from the radially inward surface to the radially outward surface, the bearing surface defining a second plurality of annular ribs surrounding the stem bore, the bearing surface and the second plurality of annular ribs being formed from the rubber; and
a valve disc positioned in the fluid bore of the seat and configured to move about and between a closed position and an open position, wherein the valve disc in the closed position blocks a flow path from the first axial end of the seat to the second axial end of the seat, and wherein the valve disc in the open position opens the flow path from the first axial end of the seat to the second axial end of the seat; and
wherein the radially outward surface of the seat is bonded to the radially inward surface of the valve body.

14. The bonded seat valve of claim 13, wherein the first plurality of annular ribs comprises at least five annular ribs and the plurality of annular grooves comprises at least five annular grooves.

15. The bonded seat valve of claim 13, wherein:
the seat defines a first flange at the first axial end of the seat and a second flange at the second axial end of the seat;
the valve body defines a first flange cutout at the first axial end of the valve body and a second flange cutout at the second axial end of the valve body; and
the first flange is positioned in the first flange cutout and the second flange is positioned in the second flange cutout.

16. The bonded seat valve of claim 13, wherein the valve body comprises cast iron.

17. The bonded seat valve of claim 13, further comprising a stem attached to the valve disc, wherein the valve body defines a stem bore that is aligned with the stem bore defined by the seat, wherein the stem extends through the stem bore defined through each of the valve body and the seat, and wherein at least one of the first plurality of annular ribs intersects the stem bore of the seat and at least one of the plurality of annular grooves intersects the stem bore of the valve body.

18. The bonded seat valve of claim 17, wherein the valve disc and the stem are configured to rotate together about and between the closed position and the open position, and wherein the valve disc is configured to compress the seat into at least one of the plurality of annular grooves when the valve disc rotates from the open position to the closed position.

19. A method of manufacturing a bonded seat valve, the method comprising:
forming a valve body comprising a first axial end, a second axial end, and a central section, the first axial end distal from the second axial end, the central section between the first axial end and the second axial end, the central section defining a radially inward surface and a radially outward surface, the radially inward surface defining a seat bore therethrough from the first axial end to the second axial end, the radially inward surface defining a plurality of annular grooves;
molding a seat over the radially inward surface in the seat bore of the valve body, the seat comprising a first axial end, a second axial end, and a central section, the first axial end distal from the second axial end, the central section between the first axial end and the second axial end, the central section defining a radially inward surface and a radially outward surface, the radially inward surface defining a fluid bore therethrough from the first axial end to the second axial end, the radially outward surface defining a first plurality of annular ribs extending into the plurality of annular grooves, the radially inward surface defining a bearing surface, the bearing surface being generally flat and defining a perimeter, a stem bore defined extending through the central section from the radially inward surface to the radially outward surface, the bearing surface defining a second plurality of annular ribs surrounding the stem bore, each annular rib of the second plurality of annular ribs being spaced inwards from the perimeter towards the stem bore; and
positioning a valve disc in the fluid bore of the seat.

20. The method of claim 19, wherein molding the seat comprises molding a rubber in a mold covering the radially inward surface of the valve body, and wherein the bearing surface and the second plurality of annular ribs are formed from the rubber.

21. The method of claim 19, wherein forming the valve body comprises casting the valve body in a mold.

* * * * *